United States Patent
Yoshimura et al.

(10) Patent No.: US 7,732,806 B2
(45) Date of Patent: Jun. 8, 2010

(54) REFRACTIVE INDEX VARIABLE ELEMENT

(75) Inventors: Reiko Yoshimura, Kawasaki (JP);
Hideyuki Nishizawa, Tokyo (JP); Kenji Todori, Yokohama (JP); Ko Yamada, Yokohama (JP); Fumihiko Aiga, Yokohama (JP); Tsukasa Tada, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1018 days.

(21) Appl. No.: 11/441,092

(22) Filed: May 26, 2006

(65) Prior Publication Data

US 2006/0279833 A1    Dec. 14, 2006

(30) Foreign Application Priority Data

May 30, 2005    (JP)    ............... 2005-157529

(51) Int. Cl.
*H01L 31/00*    (2006.01)
(52) U.S. Cl. .................. 257/17; 257/21; 257/E29.071; 385/2; 385/14; 385/141; 977/774; 977/778; 977/810; 977/932
(58) Field of Classification Search ........................ None
See application file for complete search history.

(56) References Cited

U.S. PATENT DOCUMENTS

| | | | |
|---|---|---|---|
| 5,307,200 A | 4/1994 | Yoshida | |
| 5,936,258 A * | 8/1999 | Imamura et al. | ............... 257/21 |
| 6,005,707 A | 12/1999 | Berggren et al. | |
| 2003/0066998 A1* | 4/2003 | Lee | ............... 257/19 |
| 2006/0065902 A1 | 3/2006 | Todori et al. | |
| 2006/0067602 A1 | 3/2006 | Todori et al. | |

FOREIGN PATENT DOCUMENTS

JP    5-289123    11/1993

(Continued)

OTHER PUBLICATIONS

U.S. Appl. No. 12/049,662, filed Mar. 17, 2008, Todori, et al.

(Continued)

*Primary Examiner*—Evan Pert
*Assistant Examiner*—Scott R Wilson
(74) *Attorney, Agent, or Firm*—Oblon, Spivak, McClelland, Maier & Neustadt, L.L.P.

(57) ABSTRACT

A refractive index variable element has a structure including a solid matrix, and one or more types of quantum dots dispersed in the solid matrix and having discrete occupied and unoccupied electron energy levels. The quantum dots perform a function of generating a pair of positive and negative charges upon irradiation with light, a function of trapping a positive charge, and a function of trapping a negative charge. The quantum dots performing the function of trapping a negative charge are selected from the group consisting of a combination of a negatively charged accepter and a positively charged atom, where the outermost electron shell of the positively charged atom is fully filled with electrons so that an additional electron occupies an upper different shell orbital when receives an electron, a metal chelate complex, and metallocene and derivatives thereof.

18 Claims, 3 Drawing Sheets

FOREIGN PATENT DOCUMENTS

| | | |
|---|---|---|
| JP | 11-223701 | 8/1999 |
| JP | 2002-217488 | 8/2002 |
| JP | 2002-328349 | 11/2002 |
| JP | 2005228899 A * | 8/2005 |

OTHER PUBLICATIONS

U.S. Appl. No. 11/335,634, filed Jan. 20, 2006, Reiko Yoshimura, et al.

Stanley M. Smith, et al., "Static and Dynamic Polarizabilities of Conjugated Molecules and Their Cations", J. Phys. Chem. A, vol. 108, No. 50, 2004, pp. 11063-11072.

U.S. Appl. No. 11/690,989, filed Mar. 26, 2007, Todori, et al.

* cited by examiner

REFRACTIVE INDEX VARIABLE ELEMENT

CROSS-REFERENCE TO RELATED APPLICATIONS

This application is based upon and claims the benefit of priority from prior Japanese Patent Application No. 2005-157529, filed May 30, 2005, the entire contents of which are incorporated herein by reference.

BACKGROUND OF THE INVENTION

1. Field of the Invention

The present invention relates to a refractive index variable element that can significantly vary refractive index upon irradiation with light.

2. Description of the Related Art

In an optical or electronic function device or system which uses light as an information medium, it is absolutely necessary to control the refractive index of a component material or device. This is because the propagation characteristics of light are governed by the refractive index. Therefore, it is important to design a device so as to establish prescribed refractive index distribution, to arrange a material with a prescribed refractive index in the device, or to vary the refractive index of the device, not only in an optical waveguide and an optical fiber but also in an optical switching device and an optical recording device.

Known methods for significantly varying the refractive index include (1) Stark shift, (2) Franz-Keldysh effect, (3) Pockels effect, (4) Kerr effect, (5) orientation variation, (6) level splitting by magnetic field, (7) Cotton-Mouton effect, (8) optical Stark shift, (9) absorption saturation, (10) electromagnetically induced transparency (EIT), (11) photoisomerization, (12) structural change by light irradiation, (13) photoionization, (14) piezoreflection effect, (15) thermal band shift, (16) thermal isomerization, and (17) thermally-induced structural change. Techniques of varying the refractive index through the Pockels effect are disclosed in, for example, Jpn. Pat. Appln. KOKAI No. 2002-217488, Jpn. Pat. Appln. KOKAI No. 11-223701, and Jpn. Pat. Appln. KOKAI No. 5-289123.

The refractive index can be represented by a complex number in which a real part thereof denotes the refractive index in the narrow sense and an imaginary part thereof denotes absorption. In the mechanisms for the refractive index variation cited above, the variation in the real part of the complex refractive index is large in the absorption region and the absorption edge, but is small, i.e., not larger than 1%, in the non-absorption region. Also, an optical function device utilizing variation in absorbance, such as a light-absorption type optical switch, is being studied. However, such absorption implies that the intensity of the light beam carrying the information is lowered. Thus, it is desirable that the real part of the complex refractive index can be greatly varied in a non-absorption wavelength region. Among the refractive index variable materials, liquid crystal exhibits an exceptionally large variation not smaller than 10% in the real part of the complex refractive index in the non-absorption wavelength region. This is because the refractive index variation of liquid crystal is brought about by the variation in orientation, not by the electronic polarizability variation. Taking application of a-refractive index variable material to an optical function device into consideration, however, a liquid refractive index variable material such as liquid crystal can only be applicable to significantly limited fields.

BRIEF SUMMARY OF THE INVENTION

A refractive index variable element according to an aspect of the present invention comprises: a structure comprising: a solid matrix; and one or more types of quantum dots dispersed in the solid matrix and having discrete occupied and unoccupied electron energy levels, the quantum dots performing, a function of generating a pair of positive and negative charges upon irradiation with light, a function of trapping a positive charge, and a function of trapping a negative charge, and the quantum dots performing the function of trapping a negative charge being selected from the group consisting of a combination of a negatively charged accepter and a positively charged atom, where the outermost electron shell of the positively charged atom is fully filled with electrons so that an additional electron occupies an upper different shell orbital when receives an electron, a metal chelate complex, and a metallocene and a derivative thereof.

A refractive index variable element according to another aspect of the present invention comprises: a structure comprising: a solid matrix; and one or more types of quantum dots dispersed in the solid matrix and having discrete occupied and unoccupied electron energy levels, the quantum dots performing, a function of generating a pair of positive and negative charges upon irradiation with light, a function of trapping a positive charge, and a function of trapping a negative charge, and the quantum dots performing the function of trapping a negative charge having 20% or more of electronic polarizability variation which is a value calculated by a molecular orbital method B3LYP/6–31+G*, assuming that the quantum dots have trapped a negative charge.

A refractive index variable element according to still another aspect of the present invention comprises: a structure comprising: a solid matrix; and paired quantum dots dispersed in the solid matrix, the paired quantum dots including an electron-accepting quantum dot to be converted into an anion and an electron-donating quantum dot to be converted into a cation in which an electron can be transferred between two types of quantum dots; and a voltage source which applies a voltage to the structure.

DETAILED DESCRIPTION OF THE INVENTION

The embodiments of the present invention will be described in detail.

In an embodiment of the present invention, "quantum dot" included in the structure denotes a zero-dimensional electron system whose density of states is made discrete by confining an electron in a dot-like region with a width of approximately equal to the de Broglie wavelength. In the embodiment of the present invention, the quantum dots having discrete occupied and unoccupied electron energy levels are dispersed in a solid matrix.

Figure 1A:
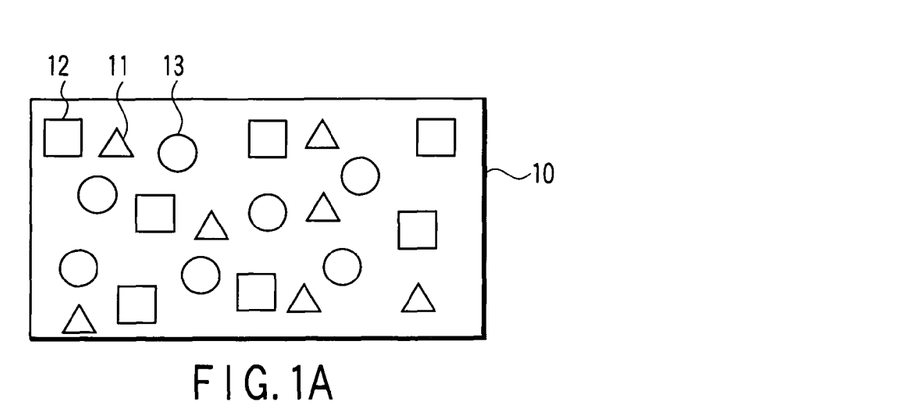
FIGS. 1A and 1B are schematic views showing the refractive index variable element according to an embodiment of the present invention.
Figure 1B:
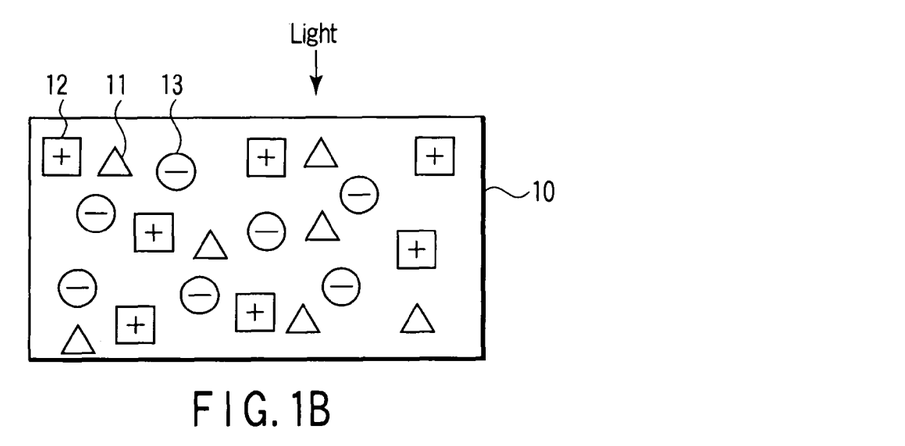

The quantum dot according to an embodiment of the present invention performs a function of generating a pair of positive and negative charges (an electron and a hole) upon irradiation with light, a function of trapping a positive charge, and a function of trapping a negative charge. FIGS. 1A and 1B schematically show the quantum dots included in a structure 10, i.e., a quantum dot 11 performing the function of generating charges, a quantum dot 12 performing the function of trapping a hole, and a quantum dot 13 performing the function of trapping an electron. The three types of the quantum dots shown in FIGS. 1A and 1B perform different functions. However, a single type of quantum dot may perform plural functions. Also, plural types of quantum dots each performing the same function may be included in the structure 10.

In the refractive index variable element according to the embodiment of the present invention, a pair of positive and negative charges are generated by the function of the quantum dots upon irradiating the structure with light, whereby the refractive index varies making use of a phenomenon that the molecular polarizability greatly varies in the quantum dots having trapped a negative charge.

The refractive index variable element according to the embodiment of the present invention may be provided with a light source which irradiates the structure with light. Further, the refractive index variable element according to the embodiment of the present invention may be provided with transparent electrodes positioned to have the structure sandwiched therebetween. The light irradiation by the light source and the voltage application by the transparent electrodes can be performed simultaneously. Also, the quantum dots which have trapped a negative charge to be negatively ionized and the quantum dots which have trapped a positive charge to be positively ionized may be nonuniformly distributed in the structure such that the structure is made nonuniform in refractive index.

Examples of the quantum dot performing the function of generating a pair of positive and negative charges upon irradiation with light include, for example, phthalocyanine dyes and pigments such as a metal phthalocyanine, a metal free phthalocyanine and derivatives thereof; azo dyes and pigments such as monoazo dye, bisazo dye, trisazo dye and tetrakis azo dye; perylene dyes and pigments such as perylene acid anhydride and perylene acid imide; perynon pigment; indigo dyes and pigments; quinacridone pigments; polycyclic quinone pigments such as anthraquinone, anthrone and dibromoanthrone; cyanine dyes; fullerene such as $C_{60}$ and $C_{70}$ and derivatives thereof; terephthalic acid derivatives having a carbonyl group such as dimethyl terephthalate, and diethyl terephthalate; xanthene dyes and pigments; and azurenium dye.

The quantum dot performing the function of trapping the positive charge has an ionization potential smaller than that of the material constituting the solid matrix and has a property to be stabilized when it receives a hole. Examples of the quantum dot performing the function of trapping a positive charge include, for example, aryl amines such as diphenylamine and triphenylamine or heterocyclic compounds such as hydrazones, oxazoles, oxadiazoles and pyrazolines.

The quantum dot performing the function of trapping the negative charge exhibits electron affinity higher than that of the material constituting the solid matrix and has a property to be stabilized when it traps an electron. The quantum dot performing the function of trapping a negative charge is selected from the group consisting of [1] a combination of a negatively charged accepter and a positively charged atom, where the outermost electron shell of the positively charged atom is fully filled with electrons so that an additional electron occupies an upper different shell orbital when receives an electron, [2] a metal chelate complex, and [3] a metallocene and a derivative thereof.

[1] The combination of a negatively charged accepter and a positively charged atom, where the outermost electron shell of the positively charged atom is fully filled with electrons so that an additional electron occupies an upper different shell orbital when receives an electron, includes organic acid salts or inorganic acid salts of a group I or II element, and complexes including a group I or II element and π-conjugated compound such as TCNQ (7,7,8,8-tetracyanoquinodimethane), TCNE (tetracyanoethylene), 1,4-benzoquinone or a halogen-substituted compound thereof represented by the molecular formula of $C_6X_4(:O_2)$ (X=F, Cl, Br).

[2] The metal chelate complex includes, for example, an acetyl acetone complex such as sodium acetylacetonate and calcium bisacetylacetonate; a catechol complex such as $H_3[Na(O_2C_6H_4)_2]$ and $K_2[Ca(O_2C_6H_4)_2]$; and an oxine complex such as magnesium bisoxine and aluminum trioxine. The chemical formulas [I] and [II] given below exemplify the catechol complexes.

$H_3[Na(O_2C_6H_4)_2]$ [I]

$K_2[Ca(O_2C_6H_4)_2]$ [II]

[3] A metallocenes and a derivative thereof include metallocenes represented by the general formula of $(C_2H_5)_2M$ (where M is selected form Fe, Ni, Ti, Cr, Mn, Co, and Ru), and metallocene derivatives represented by the following chemical formula [III] having a substituent X (where X is selected from an acyl group, a substituted or unsubstituted aromatic hydrocarbon group, a substituted or unsubstituted heteroaromatic group, a nitro group, a halogeno group, a cyano group and a sulfo group, the substituent for the aromatic hydrocarbon group and the heteroaromatic group being selected from a nitro group, a halogeno group, a cyano group and a sulfo group). Specifically, the metallocene and metallocene derivative include, for example, ferrocene, nickelocene, acetylferrocene, phenylferrocene, p-nitrophenylferrocene, acetylnickelocene, phenylnickelocene and p-nitrophenylnickelocene.

[III]

On the other hand, the refractive index is related to the molecular polarizability through the Lorentz-Lorenz equation as given below:

$$\frac{n^2-1}{n^2+2} \cdot V_{mol} = \frac{4\pi}{3} \cdot N_A \cdot \alpha \equiv R_0,$$

$$\frac{n^2-1}{n^2+2} \cdot V = \frac{4\pi}{3} \cdot \alpha = \frac{R_0}{N_A},$$

$$\frac{n^2-1}{n^2+2} = \frac{4\pi}{3} \frac{\alpha}{V},$$

where $V_{mol}$ denotes a volume per mol ($N_A$=6.02×10$^{23}$).

Since $\rho$=M/$V_{mol}$, the above equation can be rewritten in the following equation (Lorentz-Lorenz equation):

$$\rho \left\{ \frac{(n^2-1)}{(n^2+2)} \right\} \frac{M}{\rho} = \left( \frac{4\pi}{3} \right) N_A \alpha.$$

where n denotes a refractive index, $V_{mol}$ denotes a volume per mol, $N_A$ denotes the Avogadro's number, V denotes a volume per one dot, M denotes a molar mass (mass per mol), $\rho$ denotes a density, and $\alpha$ denotes a polarizability. $R_0$ is defined as a molar refractive index. It follows that the refractive index variation can be roughly calculated based on the polarizability variation. The electronic polarizability of the quantum dot can be calculated as an average polarizability <P> by the formula given below from tensor components of an static polarizability:

$$<P>=(1/3)(P_{xx}+P_{yy}+P_{zz}).$$

In the embodiment of the present invention, the static polarizability $\alpha$ (0; 0) is calculated by the density functional theory (DFT) using Becke's three-variable exchange potential and the correction of Lee-Yang-Pearl's correlation potential (B3LYP). 6–31+G* basis set including the sp diffuse function is used. The quantum dot having the polarizability of the anion quantum dot <P(−1)> at least 20% larger than that of the neutral quantum dot <P> is employed as the quantum dot having the electron trapping function.

It is desirable for the density of the quantum dots to be 3 to 50% by volume of the entire structure, though the value differs depending on the type of the quantum dot. If the density is lower than 3% by volume, the change in the refractive index of the entire structure tends to be diminished. Also, if the density is higher than 50% by volume, the barrier between the adjacent quantum dots tends to be eliminated.

It is desirable for the matrix material to be optically inactive and to be small in dispersion of the molecular weights. The matrix material satisfying the particular requirements includes, for example, transparent polymers such as polyethylene, Nylon, polyester, polycarbonate, polyarylate, butyral resin, polystyrene, styrene-butadiene copolymer, polyvinyl acetal, diaryl phthalate resin, silicone, polysulfone, acrylic resin, vinyl acetate, polyolefin oxide resin, alkyd resin, styrene-maleic anhydride copolymer, phenolic resin, vinyl chloride-vinyl acetate copolymer, polyester carbonate, polyvinyl chloride, polyvinyl acetal, polyacrylate, paraffin wax and polystyrene. It is also possible to use an inorganic glass prepared by the sol-gel method as the matrix material. These matrix materials can be used singly or in combination. Particularly, in the case of using a matrix material having a high relative dielectric constant, it is possible to obtain the merit that the energy of the quantum dot trapping the electron can be stabilized by the dielectric relaxation. It is also possible in some cases to obtain the effect that the variation in the polarizability can be increased depending on the system.

Incidentally, the refractive index variable element according to the embodiment of the present invention tends to be confused with a photorefractive material in that the quantum dots dispersed in the solid matrix are capable of generating a pair of positive and negative charges upon light irradiation and that the refractive index is varied by the separation of the charges. However, the photorefractive effect greatly differs from the refractive index variation that is brought about by the mechanism of the present invention. The photorefractive effect denotes the phenomenon that an electric field is generated within a substance by light absorption, and an electrochemical effect (nonlinear optical effect) is generated by the electric field so as to generate the refractive index. Therefore, it is absolutely necessary to use a nonlinear optical material that brings about the nonlinear optical effect. However, a nonlinear optical effect is not utilized in the embodiment of the present invention and, thus, it is unnecessary to use a nonlinear optical material in the embodiment of the present invention. On the other hand, in the embodiment of the present invention, it is necessary to use a quantum dot whose electronic polarizability greatly varies by trapping the electron as a constituent element bringing about a refractive index variation. It should also be noted that an interference of light within a substance is required for producing the photorefractive effect. However, the interference of light is not required in the embodiment of the present invention, and the charge separation of the positive and negative charges is carried out within the region irradiated with light. Further, the refractive index variation that can be achieved by the photorefractive effect is $10^{-4}$ to $10^{-3}$. On the other hand, at least $10^{-1}$ of the refractive index variation can be achieved in the refractive index variable element according to the embodiment of the present invention.

The electronic polarizability variation of the quantum dot trapping an electron is utilized in an embodiment of the present invention. A similar effect can also be obtained in the case of injecting an electron from the outside into the quantum dot. However, where the electron is injected from the outside into the quantum dot, the Coulomb repulsion in the structure increases in accordance with increase in the injected amount of the electrons. Therefore, it is necessary to control the applied voltage. In the embodiment of the present invention, however, both positive and negative charges are generated in the structure so as to maintain a neutral state as a whole, with the result that the Coulomb repulsion does not increase in the structure. It follows that, in the embodiment of the present invention, it is possible for the quantum dots having the charges injected to be accumulated in the structure at a high density and, thus, a higher refractive index variation can be achieved. On the other hand, the electronic polarizability variation of the quantum dots trapping the hole is small and, thus, the effect of these quantum dots on the refractive index variation of the structure is small. Thus, the refractive index variation of the entire structure is determined by the electronic polarizability variation of the quantum dots trapping the electrons.

Figure 2:
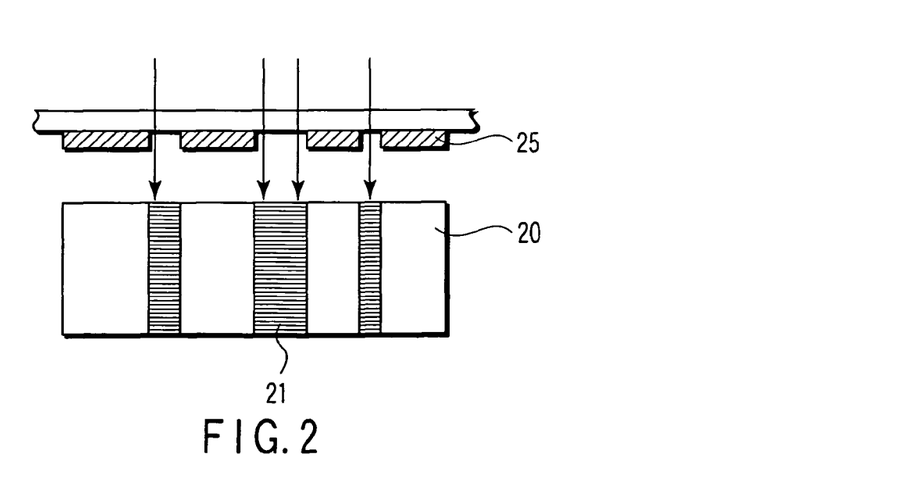
FIG. 2 is a schematic view showing a method of forming a refractive index varied section in the refractive index variable element according to an embodiment of the present invention.

In the refractive index variable element according to an embodiment of the present invention, it is possible to partially vary the refractive index in a part of the structure. For example, as shown in FIG. 2, it is possible to vary the refractive index of a light-irradiated portion 21 of a structure 20 by arranging a photomask 25 above the structure 20 for performing patterned exposure. It is also possible for a part of the structure to be scanned by a laser beam. It is also possible to form a waveguide by using these methods. Since the light beam for forming the waveguide differs in the wavelength region from the incident light used as the waveguide, it is possible to use second light as incident light while using first light for forming the waveguide.

A refractive index variable element according to another embodiment of the present invention comprises a structure including a solid matrix, and paired quantum dots dispersed in the solid matrix, the paired quantum dots including an electron-accepting quantum dot to be converted into an anion and an electron-donating quantum dot to be converted into a cation in which an electron can be transferred between two types of quantum dots. The electron-accepting quantum dot has discrete energy levels and is stable even in an anionic state. Also, the electron-donating quantum dot has discrete energy levels and is stable even in a cationic state. It is possible for the paired quantum dots to contain any of metal fine particles, semiconductor fine particles, fullerene molecules, carbon nanotubes and organic molecules or a plurality of these materials.

In the particular refractive index variable element, if a voltage is applied to the structure by a voltage source, the neutral quantum dot pair is converted into a quantum dot pair consisting of an anion and a cation so as to bring about a refractive index variation.

It is also possible for the refractive index variation to be generated in the case where an electron or a hole is transferred from an electrode into the paired quantum dots so as to generate an anion and a cation. However, since the moving distance of the electron is rendered long, the rate of the refractive index variation tends to be lowered. On the other hand, when it comes to the paired quantum dots for the embodiment of the present invention, the electron is transferred between the both quantum dots. As a result, the migrating distance of the electron is shortened so as to increase the rate of the refractive index variation. It is no problem, however, that an anion and a cation are formed by the movement of the electron or hole transferred from another quantum dot or from the electrode. It is necessary for a barrier layer to be formed between the paired quantum dots. If the quantum dot is formed of an organic molecule, it is desirable for the barrier layer to be formed of a material that inhibits the electron migration by tunneling. For example, it is desirable for the barrier layer to be formed of an alkyl chain linking the paired quantum dots. It is easily possible to introduce a linking group, such as an alkyl chain, in the synthesizing process. On the other hand, where the paired quantum dots are linked by a π-electron conjugated system alone, it is possible for the electron to be transferred under an ordinary state even if a voltage is not applied, resulting in failure to obtain the effect of varying the refractive index.

If the refractive index variable element according to the embodiment of the present invention is irradiated with light from the light source having an energy exceeding the barrier in applying a voltage to the refractive index variable element, the anion-cation pairs can be formed more efficiently. Also, if an anion-cation pair is formed, a spontaneous polarization is generated. Spontaneous polarization permits enhancing the effect of increasing the refractive index, as in a ferroelectric material. In a ferroelectric material, the deviation between the center of the positive charge and the center of the negative charge is under the state of having a limited polarization even if no voltage is applied, and the ferroelectric material has a large dielectric constant and anisotropy. In general, dielectric polarization is dependent on the frequency and is reflected in the properties relating to a low frequency. Since dielectric polarization also affects the frequency component of light, the refractive index is increased so as to exhibit anisotropy. It follows that the refractive index can be increased if spontaneous polarization characteristics are artificially imparted. Also, the refractive index can be controlled if it is possible to control the spontaneous polarization.

Figure 3A:
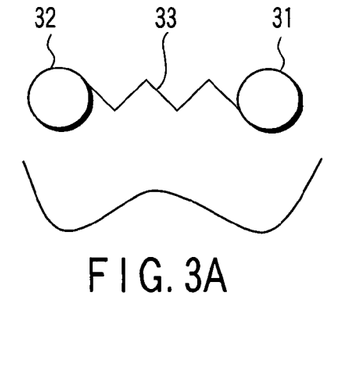
FIGS. 3A and 3B are schematic views showing a paired quantum dot used in the refractive index variable element according to another embodiment of the present invention.
Figure 3B:
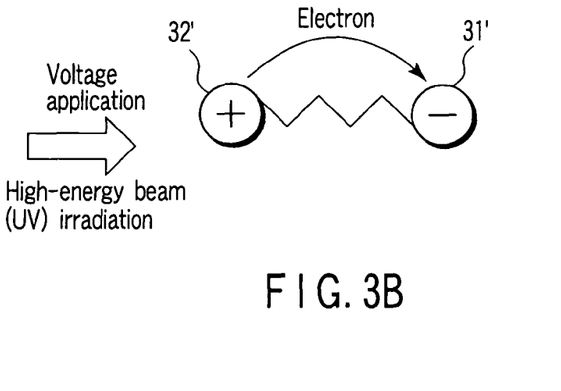

FIGS. 3A and 3B schematically show the paired quantum dots according to another embodiment of the present invention. Specifically, FIG. 3A shows the paired quantum dots in which an electron-accepting quantum dot 31 is linked to an electron-donating quantum dot 32 via an alkyl chain 33. Each of the electron-accepting quantum dot 31 and the electron-donating quantum dot 32 has a minimum potential, and a potential barrier (i.e., a barrier layer formed by the alkyl chain 33) is formed between the quantum dots 31 and 32. If a voltage is applied, the electron is transferred over the potential barrier from the electron-donating quantum dot 32 to the electron-accepting quantum dot 31, as shown in FIG. 3B. As a result, the electron-accepting quantum dot 31 is converted into an anion quantum dot 31' and the electron-donating quantum dot 32 is converted into a cation quantum dot 32'.

For example, $C_{60}$ is stable even under any of the neutral state, the anionic state and the cationic state. It follows that if paired quantum dots formed of $C_{60}$ molecules are linked to each other with an alkyl chain interposed therebetween, a voltage application causes one $C_{60}$ quantum dot to be put under an anionic state and the other $C_{60}$ quantum dot to be put under a cationic state, thereby varying the refractive index. Positive and negative charges are generated simultaneously in this case, so as to cause the entire paired quantum dots to retain a neutral electric state and, thus, the paired quantum dots are not charged up. If the paired quantum dots are irradiated with high-energy light such as ultraviolet light in applying voltage to the paired quantum dots so as to facilitate the jumping of the charge (electron) over the potential barrier, it is possible to lower the voltage required for the electron migration.

Under the state shown in FIG. 3A, it is necessary for the electron that can be transferred to be present in any of the quantum dots. Therefore, in order to prevent the electron from being spread over both quantum dots, it is desirable for the two quantum dots to be linked to each other by, for example, an alkyl chain. It should be noted, however, that the linkage group between the two quantum dots is not limited to an alkyl chain as long as the linkage group is not conjugated.

It is possible to use a hole transport molecule or a hole injection molecule as the quantum dot generating electrons. The variation of the entire refractive index is determined substantially by the refractive index variation of the anionic quantum dots, and the refractive index variation is increased in the case of injecting an electron into an electron accepting quantum dot. The refractive index is not greatly varied between the neutral state and the cationic state of the electron-donating quantum dot, and the refractive index may increase or decrease slightly. The contribution of the anionic quantum dot is large in respect to the refractive index variation. To be more specific, the characteristics of an anionic quantum dot are of critical importance such that the refractive index variation is increased or decreased in accordance with such characteristics. The refractive index variation is not increased only by the intramolecular charge migration brought about.

In an embodiment of the present invention, a voltage source for applying a voltage to the structure comprising the paired quantum dots includes, for example, a pair of electrodes arranged to have the structure sandwiched therebetween and a probe of a near-field scanning optical microscope (NSOM).

Where the voltage source is formed of a pair of electrodes having the structure sandwiched therebetween, it is possible to arrange at least one of the paired electrodes in a manner to correspond to a part of the structure. In this case, it is possible to divide at least one of the paired electrodes into a plurality of sections and to select any part of the structure for the electron migration for selectively varying the refractive index of the selected part.

Also, the efficiency of generating the anion-cation quantum dot pairs is improved if the structure is excited with light while applying a voltage to the structure, though the anion-cation quantum dot pairs can be generated by only voltage application or by only excitation with light.

Where the voltage source is formed of a pair of electrodes having the structure sandwiched therebetween, it is possible for the two electrodes to be opaque to light in the case where the light is transmitted only through the structure sandwiched between the two electrodes. Light irradiation is performed through paired electrodes in many cases. In such a case, it is necessary for both or one of the two electrodes to be transparent to light.

In an embodiment of the present invention, the mechanism for the electron to be transferred through the barrier layer interposed between the electron-accepting quantum dot and the electron-donating quantum dot upon voltage application includes (1) an electron migration over the barrier, (2) a tunneling effect, and (3) a hopping conduction. Where a high voltage is applied in case (1) above, the electron is likely to be transferred easily over the barrier. Where the barrier layer (e.g., an alkyl chain) is sufficiently thin in case (2) above, the tunneling is likely to take place easily. Further, where the barrier layer is amorphous or contains impurities or ions in case (3) above, localized levels are formed and, thus, the electron is conducted by hopping.

The tunneling effect of case (2) will now be described more in detail. The tunneling effect denotes the phenomenon that, when an electron having an energy E smaller than a potential $V_0$ collides against a barrier with a potential height $V_0$ in a quantum system, the electron tunnels the barrier. The tunneling effect is generated in the case where the probability t is not zero either inside or outside the barrier. According to the Schrodinger equation, the transmittance through the barrier, i.e., the probability t of the tunneling effect, is represented by the formula given below (see "Summary of single electron tunneling" by J. Haruyama, published first by Corona Inc. in 2002):

$$t = \frac{4E(V_0 - E)}{V_0^2 \sinh^2(a/2b) + 4E(V_0 - E)},$$

$$b = \sqrt{\frac{2m_0(V_0 - E)}{\hbar^2}},$$

where $m_0$ denotes the mass of an electron, $\hbar$ denotes the Dirac constant ($h/2\pi$), and $a$ denotes the thickness of the barrier.

The formula given above indicates that the tunneling tends to be occurred easily with a lower of the barrier thickness $a$.

The refractive index relates to the energy gap between the ground level (HOMO: highest occupied molecular orbital; SOMO single occupied molecular orbital) and the excited level (LUMO: lowest unoccupied molecular orbital) and is determined by the relationship between the two levels.

In an embodiment of the present invention, the effect of the refractive index variation in the structure can be maintained after formation of the anion-cation pair even if the voltage source is not used and, thus, the electron injection section can be removed after the electron injection.

The present invention provides a new mechanism for varying the refractive index. The refractive index variable element according to an embodiment of the present invention makes it possible to obtain a refractive index variation greater than that obtained by a conventional element.

The mechanism of the refractive index variation in the present invention is as follows. If an electron is injected into the quantum dot, an outermost shell orbital (i.e., the highest occupied molecular orbital having a higher energy) is newly formed on the outside of the outermost shell orbital (i.e., the highest occupied molecular orbital) that greatly contributes to the determination of the refractive index. If the particular quantum dot is surrounded by a solid matrix, it is possible to obtain a greater refractive index variation effect. On the contraries, if an electron is discharged from the quantum dot, a new orbital is not formed, and thus the refractive index variation is small compared with the case of the electron injection. Nevertheless, a large variation can be expected also in the latter case relative to that produced by the conventional technique utilizing the nonlinear optical effect.

The effect produced by the refractive index variable element according to an embodiment of the present invention greatly differs from the effect produced by the prior art in which the refractive index variation of the structure can be obtained by a second-or third-order nonlinear optical effect. The differences between the present invention and the prior art are as summarized in the following.

(1) In general, there are several methods of varying the absorption spectrum, such as by photochromism. The refractive index variation in the vicinity of the absorption edge is relatively large as derived from the Kramers-Kronig relation. Therefore, the method of varying the real part of the complex refractive index by varying the absorption spectrum or the absorption coefficient is widely employed. However, it is difficult to greatly vary the refractive index in a transparent region. In an embodiment of the present invention, however, a large refractive index variation can be achieved even in a transparent region.

(2) In the case of a general 3-dimensional bulk semiconductor, a large number of electrons are present on the same excited band branch. Therefore, even if a single electron is injected, the variation in the distribution of the electrons occupied by the band (energy level) is very small. In an embodiment of the present invention, however, the energy level of the quantum dot is discrete and, thus, the number of electrons that can be present on a single energy level is so small as to be counted. Therefore, where a single electron is newly injected into the quantum dot, the injected electron occupies the energy level on which an electron was not present. Since the energy level of the quantum dot is discrete, the width of the peak of the absorption spectrum is narrow and the transparent region is broad.

(3) The refractive index variable element according to an embodiment of the present invention is intended to guide a light wave and, thus, differs in this respect from the laser or an amplifier accompanying absorption and a resonance state. It follows that, with the increase in the transparent wavelength region, the scope of application as an optical device is broadened. Further, an embodiment of the present invention differs in principle and in the effect of varying the refractive index even in a transparent region from the quantum dot exciton effect that a third-order nonlinear optical effect is amplified by the absorption resonance effect.

(4) In an embodiment of the present invention, the refractive index is not varied in the solid matrix except the quantum dots. Therefore, the average refractive index variation as a whole is increased with increase in the density of the quantum dots. Where the refractive index variable element according to an embodiment of the present invention is used as a waveguide, it is effective to set the density of the quantum dots such that the average refractive index variation exceeds at least 1.5%. The value of 1.5% is a standard value for the refractive index variation of the waveguides in current use.

(5) In the prior art, the electron remains within an electrode for applying an electric field to the structure, and the electron simply performs polarization within the quantum dot or the molecule. To be more specific, the barrier layer is not included in the prior art. Naturally, the electron is not transferred over the barrier layer. On the other hand, in an embodiment of the present invention, the electron is transferred over the barrier layer formed between a pair of quantum dots. Incidentally, where each of the electron-accepting quantum dot and the electron-donating quantum dot is formed of an organic molecule and these molecules are linked to each other by, for example, an alkyl chain so as to form a single molecule, the barrier layer is formed in the single molecule forming the paired quantum dots.

(6) In the prior art, the nonlinear optical effect is lost and the effect of the refractive index variation is also lost when voltage ceases to be applied to the structure. On the other hand, in the anion-cation quantum dot pair according to an embodiment of the present invention, the paired quantum dots are under a semi-stable state, though their lifetime is limited. In other words, the effect of the refractive index variation is continued even after stopped applying voltage.

(7) In the Pockels effect utilized in the prior art, the degree of the refractive index variation is only about $10^{-3}$. In an embodiment of the present invention, however, the degree of the refractive index variation is $10^{-1}$ or more, if the paired quantum dots are formed at a high density. On the contrary, for bringing about the refractive index variation substantially equal to that achieved in the prior art, it suffices to arrange the paired quantum dots at a low density.

An additional description will now be given in view of the principles in conjunction with the differences between the present invention and the prior art noted above. The light incident on the quantum dot causes the electric field thereof to vibrate an electron shell (excitation). The vibrated electron shell emits light. The emission process is related to Einstein B coefficient, and time is required to some extent from the excitation to the emission even in a non-resonance region. The light is propagated while repeating the excitation and emission. The time required for the excitation and emission determines the phase velocity $V_p$ of light propagation. Where C is the light velocity in a vacuum, $V_p/C$ is the real part of the complex refractive index that is to be varied in the present invention. The refractive index is related to the molecular polarizability through the Lorentz-Lorenz equation as described previously.

In the prior art, it was customary to employ the method of varying the molecular polarizability by distorting the electron orbital by applying an electric field by utilizing a second- or third-order nonlinear optical effect. However, the variation of the polarizability achieved by this method is small. On the other hand, where an electron is injected into the quantum dot of a nano scale size, an orbital is newly formed. In addition, Coulomb repulsion is brought about. It follows that the chemical potential of HOMO and LUMO and the HOMO-LUMO gap are greatly varied. Also, the polarizability is greatly varied by these effects. Incidentally, where an electron is discharged from the quantum dot, a new orbital is not formed and, thus, the refractive index variation is small, compared with the case of injecting an electron. Nevertheless, a large refractive index variation can be expected, compared with the variation of the polarizability produced by the nonlinear optical effect employed in the prior art.

EXAMPLES

Example 1

In this Example, simulation was carried out in respect of electronic polarizability variation and the refractive index variation, covering the case where a single electron was trapped by each of various types of neutral quantum dots dispersed in a vacuum matrix. The average polarizability <P> was calculated on the basis of B3LYP/6–31+G*. The refractive index was calculated by the Lorentz-Lorenz equation based on the obtained values of the average polarizability <P>. The calculation was performed on the basis that the density of the quantum dots was set at 15% or 5%. The polarizability variation (unit: times) and the refractive index variation (unit: times) were calculated relative to the polarizability and the refractive index before the electron trapping. Table 1 shows the results:

TABLE 1

Calculated values of the polarizability variation and refractive index Variation through electron trapping for Various types of quantum dots (B3LYP/6-31 + G*)

| Quantum dot | Polarizability variation (times) | Refractive index variation (times) | |
|---|---|---|---|
| | | Density 15% | Density 5% |
| $Na_2SO_4$ | 38.94 | — | 2.51 |
| $CH_3COONa$ | 23.62 | — | 1.55 |
| $CH_3COOK$ | 37.74 | — | 2.22 |
| $(COONa)_2$ | 33.41 | — | 2.43 |
| CuCl | 3.35 | 1.30 | 1.10 |
| $MgSO_4$ | 1.92 | 1.08 | 1.03 |
| $CaSO_4$ | 3.08 | 1.20 | 1.07 |
| $(COO)_2Ca$ | 2.48 | 1.15 | 1.05 |
| $ZnSO_4$ | 1.41 | 1.04 | 1.01 |
| $ZnCl_2$ | 1.96 | 1.07 | 1.03 |
| $(COO)_2Zn$ | 1.34 | 1.03 | 1.01 |
| o-chloranil (Comparative Example) | 1.11 | 1.005 | 1.002 |

In the quantum dot formed of a salt of a group Ia metal (Na, K), the average polarizability of the anion was very large in the electron trapping state. Therefore, if the density was set at 15%, it was impossible to calculate the refractive index by the Lorentz-Lorenz equation. In these systems, it was possible to obtain a very large refractive index variation even if the density was lowered to about 5%. In the case of o-chloranil ($C_6O_2Cl_4$) for the Comparative Example, the polarizability variation of the single dot (molecule) was found to be only about 11% and, thus, the variation was small even in the case of converting the polarizability into the refractive index. On the other hand, in the case of the other quantum dots for this Example, obtained was the calculated value of the refractive index variation not smaller than 1% even if the density was set at 5%. Also, the polarizability variation was calculated for the case where sodium acetate ($CH_3COONa$) was dispersed in a dielectric matrix having a specific dielectric constant of 10.43, with the result that the polarizability variation was found to be 22.98 times. This value is slightly smaller than that shown in Table 1. However, the stabilization energy through electron trapping (electron affinity of sodium acetate) was found to be about 1.5 times as much as that in vacuum. It has thus been confirmed that a quantum dot trapping an electron is more stabilized by using a dielectric matrix.

Example 2

Figure 4:
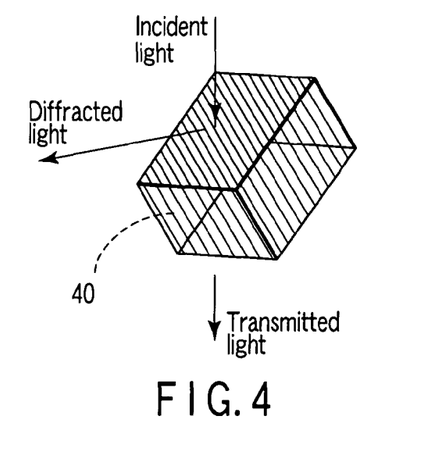
FIG. 4 is a perspective view showing the diffraction element in Example 2 of the present invention.

As shown in FIG. 4, a structure 40 prepared by uniformly dispersing a quantum dot material in a polymer was irradiated with a laser beam so as to form a striped diffraction pattern, thereby manufacturing a refractive index variable element that can be used as a diffraction element.

A triphenyl amine derivative represented by the chemical formula [IV] was used as a quantum dot performing the charge generating function and the hole trapping function.

Also the compound shown in Table 2 was used as the quantum dot performing the electron trapping function. These quantum dots were uniformly dispersed in polyvinyl alcohol in a density of 1.0 mmol/cm³ so as to prepare a film having a thickness of 1.0 μm. Then, a diffraction stripe was depicted on the film by using a laser beam having a wavelength of 350 nm.

Figure 5:
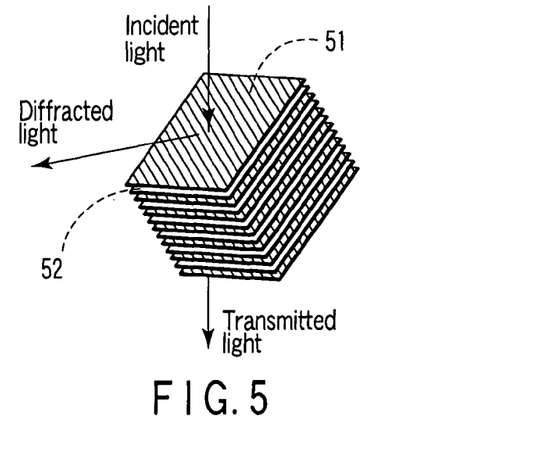
FIG. 5 is a perspective view showing the diffraction element for the Reference Example to be compared with Example 2.

As a reference Example, manufactured was a refractive index variable element comprising transparent multi-layered lattice electrodes 51 and a structure 52 sandwiched between the adjacent layers of the lattice electrodes 51 as shown in FIG. 5. For preparing the material of the structure 52, a polymer liquid crystal represented by the chemical formula [V] was uniformly dispersed in polystyrene in a density of 1.0 mmol/cm³, and the dispersion layers were laminated one upon the other so as to form a film having a total thickness of 1.0 μm.

Further, an electric field was applied to the structure 52 by applying a voltage of 15V to each of the electrodes 51, thereby manufacturing a diffraction element.

The diffraction element was irradiated with light having a wavelength of 900 nm so as to measure the amount of the diffracted light. Table 2 shows the diffraction efficiency ratio. As shown in Table 2, in the case of using a quantum dot formed of the material specified in the present invention, it is possible to obtain a diffraction efficiency ratio at least 10 times as high as that for the reference Example. The experimental data verifies that the refractive index variable element of the present invention makes it possible to obtain a very large refractive index variation.

TABLE 2

| Quantum dot | Ratio of diffraction efficiency (arb. units) |
|---|---|
| Polymer liquid crystal (Reference Example) | 100 |
| o-chloranil (Comparative Example) | 200 |
| $Na_2SO_4$ | 4000 |
| $CH_3COOK$ | 3400 |
| $(COONa)_2$ | 3700 |
| CuCl | 1700 |
| $MgSO_4$ | 1500 |
| $(COO)_2Ca$ | 1600 |
| $(COO)_2Zn$ | 1400 |

Example 3

A triphenyl amine derivative represented by the chemical formula [VI] was used as the quantum dot (A) performing the charge generating function and the hole trapping function. Six types of molecules shown in Table 3 were used as quantum dots (B) performing the electron trapping function. Table 3 shows the polarizability variation caused by trapping of an electron for these molecules (B3LYP/6–31+G*). Polymethyl methacrylate (PMMA) was used as the matrix material.

A vacuum deposition was performed under an evaporating temperature of 400° C. and vacuum of $10^{-5}$ Torr so as to form 20 layers each containing quantum dots (A) and additional 20 layers each containing quantum dots (B) such that the layer containing the quantum dots (A) and the additional layer containing the quantum dots (B) were formed alternately on a glass substrate so as to obtain a structure including 40 layers in total and a having a total thickness of 1.0 μm.

Figure 6:
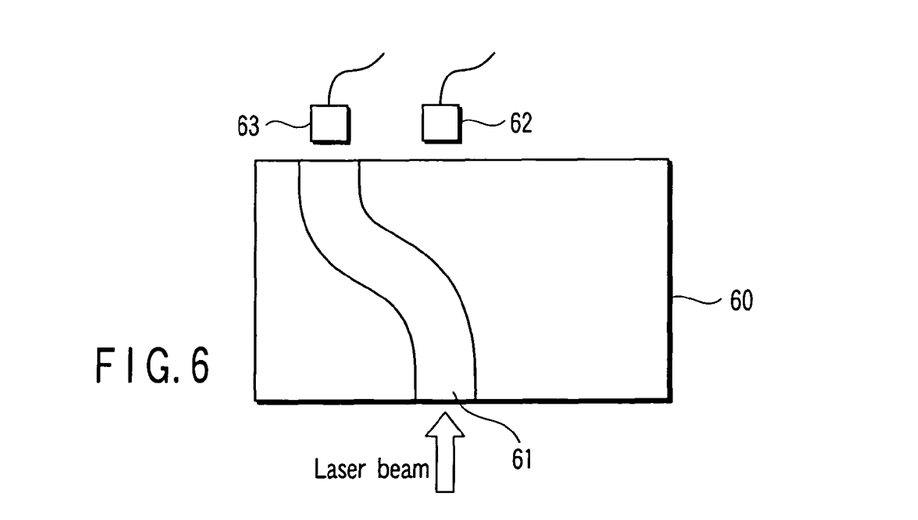
FIG. 6 is a plan view showing the waveguide in Example 3 of the present invention.

As shown in FIG. 6, a structure 60 was exposed to light having a wavelength of 350 nm through a photomask so as to form a pattern of a bent waveguide 61. A laser light having a wavelength of 800 nm was made incident on the waveguide 61. A first photodetector 62 was arranged on an extension of the optical axis of the laser light as viewed from the inlet of the waveguide 61, and a second photodetector 63 was arranged on the outlet of the waveguide 61 so that each of these photodetectors measured the light amount.

As shown in Table 3, the light was scarcely detected by the first photodetector 62 in the case of using any of the electron trapping molecules. On the other hand, 80 to 90% of the incident light was detected by the second photodetector 63. It has thus been confirmed that the refractive index variable element of the present invention performs the function of a waveguide.

TABLE 3

[VI]

(chemical structure showing triphenyltriamine with methyl substituents)

| Electron-trapping molecule | Polarizability variation [calculated value] (times) | Light amount on first detector (%) | Light amount on second detector (%) |
|---|---|---|---|
| Ferrocene | 1.34 | 1 | 85 |
| Acetylferrocene | 1.29 | 2 | 83 |
| p-nitrophenyl ferrocene | 1.97 | 0 | 92 |
| Nickelocene | 1.23 | 3 | 83 |
| Phenylnickelocene | 1.22 | 3 | 81 |
| p-nitrophenyl nickelocene | 1.49 | 0 | 90 |

Example 4

Prepared were six types of films (structures) equal to those used in Example 3 and, then, elements were manufactured by sandwiching these films between ITO electrodes. The refractive index of each of these elements was measured by using a microscopic ellipsometer. Then, after a voltage of 20V was applied from the ITO electrode to the film for one minute, the refractive index of the element was measured again. An increase of the refractive index of 0.5 to 1% was recognized in each of these elements. Further, the refractive index was measured again after the element was irradiated with light having a wavelength of 350 nm. An increase of the refractive index of 4.5 to 5.6% was recognized in each of the elements.

Example 5

Prepared were paired quantum dots 71 comprising two $C_{60}$ molecules that were linked to each other via a trimethylene chain (—$C_3H_6$—) represented by the chemical formula [VII]:

[VII]

Figure 7:
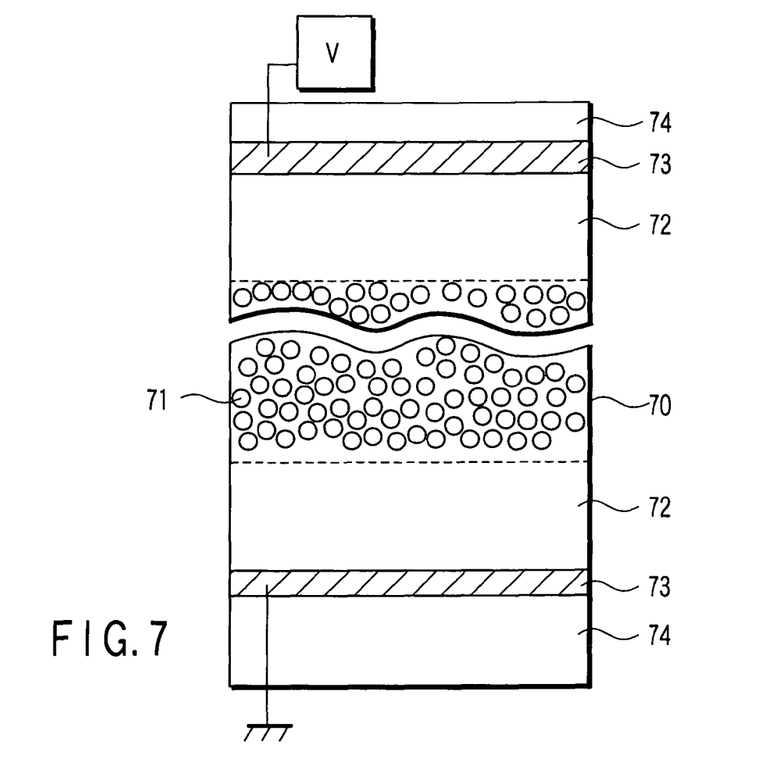
FIG. 7 is a cross-sectional view showing the refractive index variable element in Example 5 of the present invention.

A structure 70 was prepared by dispersing the paired quantum dots 71 in polystyrene in an amount of 50% by weight. Three types of structures 70 having a thickness of about 100 nm, about 300 nm and about 1 μm were prepared. As shown in FIG. 7, the structure 70 having the paired quantum dots 71 dispersed therein was sandwiched between two polystyrene films 72 each having a thickness of 100 nm so as to prepare a stack. Both surfaces of the stack were covered with glass substrates 74 each having an ITO electrode 73 formed thereon so as to manufacture an element (Example 5). The polystyrene films 72 were formed on both surfaces of the structure 70 so as to prevent electrons from being injected from the ITO electrode 73 into the paired quantum dot 71.

Figure 8:
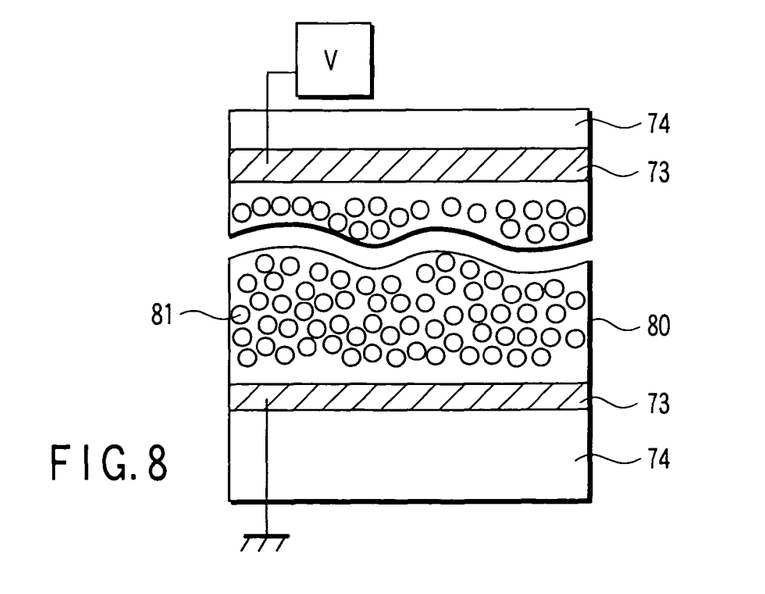
FIG. 8 is a cross-sectional view showing the refractive index variable element for Comparative Example 5.

For comparison, a structure 80 was prepared by dispersing $C_{60}$ quantum dots alone in polystyrene in a molar amount equal to that for Example 5. Prepared were three types of structures 80 having a thickness of about 100 nm, about 300 nm and about 1 μm. As shown in FIG. 8, the structure 80 was sandwiched between two glass substrates 74 each having an ITO electrode 73 formed thereon so as to manufacture an element (Comparative Example 5).

As apparent from the comparison between FIG. 7 and FIG. 8, the distance between the paired ITO electrodes 73 for Example 5 was larger by 200 nm than that for Comparative Example 5.

A voltage of 15V was applied to the element for 10 seconds while irradiating the element with light having a wavelength of 350 nm so as to permit the electrons to be transferred between the paired quantum dots in Example 5 and to permit the electrons to be injected from the electrode into the $C_{60}$ quantum dots in Comparative Example 5. Then, the voltage application was stopped. In Comparative Example 5, recognized was the reverse current, i.e., the phenomenon that the electron injected into the quantum dot by the voltage application is discharged after the voltage application was stopped. It is considered reasonable to understand that the reverse current was due to the charge-up caused by the electron injection. On the other hand, a reverse current was not recognized in Example 5 even after the voltage application was stopped.

The refractive index variation was measured by a microscopic ellipsometer. The refractive index variation was found to differ depending on the site of the structure. This is because the dispersion mass ratio of the quantum dots dispersed in the structure differs depending on the site of the structure. Employed in this case was the maximum refractive index variation measured in the element having a specified structure. The refractive index variation rate after cut off of the voltage was 6.5% for Example 5 and 5% for Comparative Example 5. The value for Example 5 was found to be about 30% higher than that for Comparative Example 5.

Measured was the refractive index variation rate during the voltage application. In Example 5, the refractive index variation rate was found to be not longer than 100 nsec regardless of the thickness of the structure. On the other hand, the refractive index variation rate was found to be not shorter than 1 μ sec even where the structure had a thickness of 100 nm. The refractive index variation rate was found to be lowered with increase in the thickness of the structure.

The refractive index variation was measured by applying a light irradiation alone without applying a voltage. The refractive index variation was found to be 2.0% for Example 5 and 1.4% for Comparative Example 5. The refractive index variation was also measured by carrying out a voltage application for one minute without applying light irradiation. The refractive index variation was found to be 6.5% for Example 5 and 5% for Comparative Example 5, which were substantially equal to those for the case where light irradiation was applied. Recognized was a similar tendency that the refractive index variation for Example 5 was higher than that for the Comparative Example under whichever conditions.

Example 6

The quantum dot pairs shown in Table 4 were dispersed in PMMA in a mass ratio of 50% by weight so as to prepare a structure having a thickness of 1 μm, followed by sandwiching the structure between two ITO electrodes so as to manufacture an element. In the first step, the refractive index of the element was measured by using a microscopic ellipsometer. Then, a voltage of 15V was applied to the element for 10 seconds while irradiating the element with light having a wavelength of 350 nm, followed by measuring again the refractive index. Table 4 shows the refractive index variation.

Then, the structure was sandwiched between two PVA films each having a thickness of 100 nm so as to prepare a stack. Further, the stack was sandwiched between two glass substrates each having an ITO electrode formed thereon so as to manufacture an element.

A voltage of 20V was applied to the element for one minute while irradiating the element with light having a wavelength of 320 nm so as to measure the refractive index variation by using a microscopic ellipsometer. Measured was the maximum refractive index variation of 1.2%. Where the light irradiation alone was applied for one minute, observed was a refractive index variation of 0.6%. Where a voltage of 20V was applied for one minute without applying the light irradiation, observed was a refractive index variation of 1.0%.

Additional elements were manufactured as above, except that tetraphenyl cyclopentadiene, hexaphenyl benzene, diphenyl anthracene or rubrene was linked to $CH_3COONa$. A voltage of 20V was applied to the element while irradiating the element with light having a wavelength of 300 nm so as to measure the variation rate of the refractive index. The refractive index variation rates were found to be 1.1%, 1.0%, 1.5%, and 1.2%.

Further elements were manufactured as above except that $CH_3COOK$ was used in place of $CH_3COONa$ and that a triphenyl amine derivative, tetraphenyl cyclopentadiene, hexaphenyl benzene, diphenyl anthracene or rubrene was

TABLE 4

| Structure of quantum dot | Refractive index variation (%) |
|---|---|
| [ferrocene-(CH₂)₃-C₆H₄-CH=N-NH₂ with O₂N substituent] | 5.5 |
| O₂N-C₆H₃(ONa)-O-(CH₂)₅-O-C₆H₄-C(=NH)NH₂ | 8.0 |
| [nickelocene with H₃C-C(=O)- and -(CH₂)₅-C₆H₄-pyrazoline(diphenyl)] | 4.0 |

Example 7

Paired quantum dots in which the methyl group of triphenyl amine derivative represented by the chemical formula [IV] described above was linked to the methyl group of $CH_3COONa$ by a trimethylene chain were dispersed in polyvinyl alcohol in an amount of 10% by weight so as to prepare a structure.

used in the electron generating section. The refractive index variation rate of the element was measured by applying a voltage of 20V to the element while irradiating the element with light having a wavelength of 300 nm. The refractive index variation rates were found to be 1.8%, 1.6%, 1.5%, 2.2% and 1.8%.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A refractive index variable element, comprising:
a structure comprising: a solid matrix; and one or more types of quantum dots dispersed in the solid matrix and having discrete occupied and unoccupied electron energy levels,
the quantum dots performing, a function of generating a pair of positive and negative charges upon irradiation with light, a function of trapping a positive charge, and a function of trapping a negative charge, and
the quantum dots performing the function of trapping a negative charge, comprising a combination of a negatively charged accepter and a positively charged atom, where the outermost electron shell of the positively charged atom is fully filled with electrons so that an additional electron occupies an upper different shell orbital when the positively charged atom receives an electron.

2. The refractive index variable element according to claim 1, further comprising a light source which irradiates the structure with light.

3. The refractive index variable element according to claim 1, further comprising transparent electrodes having the structure sandwiched therebetween.

4. The refractive index variable element according to claim 1, wherein the quantum dots which trap a negative charge to be negatively ionized and the quantum dots which trap a positive charge to be positively ionized are nonuniformly distributed in the structure such that the structure is made nonuniform in refractive index.

5. The refractive index variable element according to claim 1, wherein the combination of the negatively charged acceptor and the positively charged atom is at least one of organic acid salts, inorganic acid salts of a group I or II element, and complexes of a group I or II element and π conjugated compound.

6. A refractive index variable element, comprising:
a structure comprising: a solid matrix; and one or more types of quantum dots dispersed in the solid matrix and having discrete occupied and unoccupied electron energy levels,
the quantum dots performing, a function of generating a pair of positive and negative charges upon irradiation with light, a function of trapping a positive charge, and a function of trapping a negative charge, and
the quantum dots performing the function of trapping a negative charge, wherein a metal chelate complex is selected from the group consisting of an acetyl acetone complex, a catechol complex, and an oxine complex.

7. The refractive index variable element according to claim 6, further comprising a light source which irradiates the structure with light.

8. The refractive index variable element according to claim 6, further comprising transparent electrodes having the structure sandwiched therebetween.

9. The refractive index variable element according to claim 6, wherein the quantum dots which trap a negative charge to be negatively ionized and the quantum dots which trap a positive charge to be positively ionized are nonuniformly distributed in the structure such that the structure is made nonuniform in refractive index.

10. A refractive index variable element, comprising:
a structure comprising: a solid matrix; and one or more types of quantum dots dispersed in the solid matrix and having discrete occupied and unoccupied electron energy levels,
the quantum dots performing, a function of generating a pair of positive and negative charges upon irradiation with light, a function of trapping a positive charge, and a function of trapping a negative charge, and
the quantum dots performing the function of trapping a negative charge, wherein a metallocene or a derivative thereof is selected from the group consisting of ferrocene, nickelocene, acetylferrocene, phenylferrocene, p-nitrophenylferrocene, acetylnickelocene, phenylnickelocene, and p nitrophenylnickelocene.

11. A refractive index variable element, comprising:
a structure comprising: a solid matrix; and one or more types of quantum dots dispersed in the solid matrix and having discrete occupied and unoccupied electron energy levels,
the quantum dots performing, a function of generating a pair of positive and negative charges upon irradiation with light, a function of trapping a positive charge, and a function of trapping a negative charge, and
the quantum dots performing the function of trapping a negative charge having 20% or more of electronic polarizability variation which is a value calculated by a molecular orbital method B3LYP/6-31+G*, assuming that the quantum dots have trapped a negative charge.

12. The refractive index variable element according to claim 11, further comprising a light source which irradiates the structure with light.

13. The refractive index variable element according to claim 11, further comprising transparent electrodes having the structure sandwiched therebetween.

14. The refractive index variable element according to claim 11, wherein the quantum dots which have trapped a negative charge to be negatively ionized and the quantum dots which have trapped a positive charge to be positively ionized are nonuniformly distributed in the structure such that the structure is made nonuniform in refractive index.

15. A refractive index variable element, comprising:
a structure comprising: a solid matrix; and paired quantum dots dispersed in the solid matrix, the paired quantum dots comprising an electron-accepting quantum dot to be converted into an anion and an electron-donating quantum dot to be converted into a cation in which an electron is transferred between two types of quantum dots; and
a voltage source which applies a voltage to the structure.

16. The refractive index variable element according to claim 15, wherein transparent electrodes form a voltage source.

17. The refractive index variable element according to claim 16, further comprising a light source.

18. The refractive index variable element according to claim 15, the electron-accepting quantum dot and the electron-donating quantum dot are linked via an alkyl chain.